(12) United States Patent
Kanduri et al.

(10) Patent No.: US 12,134,298 B2
(45) Date of Patent: Nov. 5, 2024

(54) HIGH EFFICIENCY CENTRIFUGAL BLOWER

(71) Applicant: THERMO KING LLC, Minneapolis, MN (US)

(72) Inventors: Srikanth Kanduri, Hyderabad (IN); Ramesh Vedula, Bengaluru (IN); Preman Reynold Joseph, Hyderabad (IN); Sudalairaja Madasamy, Eral (IN); Ajaya Kumar, Minneapolis, MN (US)

(73) Assignee: THERMO KING LLC, Minneapolis, MN (US)

(*) Notice: Subject to any disclaimer, the term of this patent is extended or adjusted under 35 U.S.C. 154(b) by 3 days.

(21) Appl. No.: 17/826,650

(22) Filed: May 27, 2022

(65) Prior Publication Data
US 2022/0379684 A1   Dec. 1, 2022

(30) Foreign Application Priority Data
May 28, 2021   (IN) ............................. 202141023784

(51) Int. Cl.
*B60H 1/00*   (2006.01)
*F04D 17/08*   (2006.01)
*F04D 29/28*   (2006.01)

(52) U.S. Cl.
CPC ......... *B60H 1/00471* (2013.01); *F04D 17/08* (2013.01); *F04D 29/281* (2013.01)

(58) Field of Classification Search
CPC .... B60H 1/00471; F04D 17/08; F04D 29/281
See application file for complete search history.

(56) References Cited

U.S. PATENT DOCUMENTS

| | | | |
|---|---|---|---|
| 5,577,888 A | 11/1996 | Capdevila et al. |
| 5,906,179 A | 5/1999 | Capdevila |
| 5,957,661 A | 9/1999 | Hunt et al. |
| 9,909,485 B2 | 3/2018 | Hong |
| 10,060,440 B2 | 8/2018 | Fujimoto et al. |
| 10,174,768 B2 | 1/2019 | Shelton et al. |

(Continued)

FOREIGN PATENT DOCUMENTS

| | | | | |
|---|---|---|---|---|
| DE | 202019106702 U1 | * | 4/2020 | ......... F04D 25/0606 |
| JP | 3293104 B2 | * | 6/2002 | |

(Continued)

OTHER PUBLICATIONS

Machine Translation of DE202019106702U1 PDF File Name: "DE202019106702U1_Machine_Translation.pdf".*

(Continued)

*Primary Examiner* — Grant Moubry
*Assistant Examiner* — Ruben Picon-Feliciano
(74) *Attorney, Agent, or Firm* — HSML P.C.

(57) ABSTRACT

A centrifugal blower includes a blower base, multiple blades fastened to the blower base, a hub integrated to a central portion of the blower base, and a top shroud to provide surrounding coverage to the multiple blades. The centrifugal blower is housed within an evaporator. The centrifugal blower may operate at operating speeds that are lower than those of typical or currently known implementations while generating an airflow that meets or even exceeds those of the typical or currently known implementations.

18 Claims, 11 Drawing Sheets

(56) References Cited

U.S. PATENT DOCUMENTS

| | | |
|---|---|---|
| 10,247,201 B2 | 4/2019 | Hino et al. |
| 10,253,786 B2 | 4/2019 | Hino et al. |
| 10,473,113 B2 | 11/2019 | Usami et al. |
| 10,502,226 B2 | 12/2019 | Lu et al. |
| 10,550,846 B2 | 2/2020 | Hino et al. |
| 10,605,267 B2 | 3/2020 | Hino et al. |
| 10,781,826 B2 | 9/2020 | Ishida et al. |
| 10,808,714 B2 | 10/2020 | Ishii et al. |
| D901,669 S | 11/2020 | Bushnell et al. |
| 10,823,042 B2 | 11/2020 | Nishio et al. |
| 2002/0106277 A1* | 8/2002 | Chapman ............ F04D 29/4233 415/206 |
| 2020/0240433 A1 | 7/2020 | Hoyt et al. |
| 2020/0348089 A1 | 11/2020 | Halbe et al. |

FOREIGN PATENT DOCUMENTS

| | | | |
|---|---|---|---|
| JP | 2017101590 A * | 6/2017 | |
| WO | WO-2007091766 A2 * | 8/2007 | ............ F24F 1/0007 |

OTHER PUBLICATIONS

Machine Translation of JP3293104B2 PDF File Name: "JP3293104B2_Machine_Translation.pdf".*

Machine Translation of JP2017101590A PDF File Name: "JP2017101590A_Machine_Translation.pdf".*

\* cited by examiner

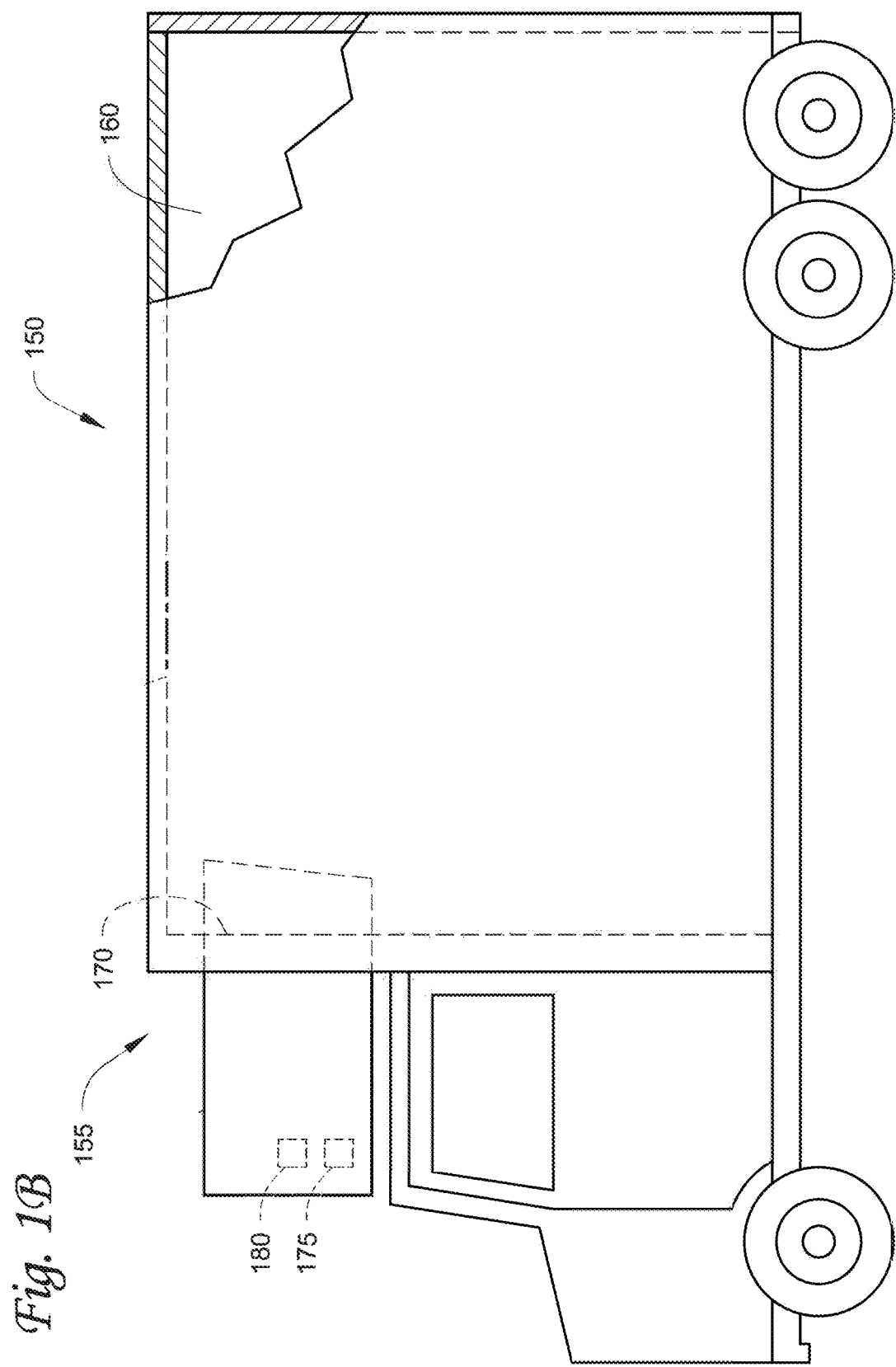

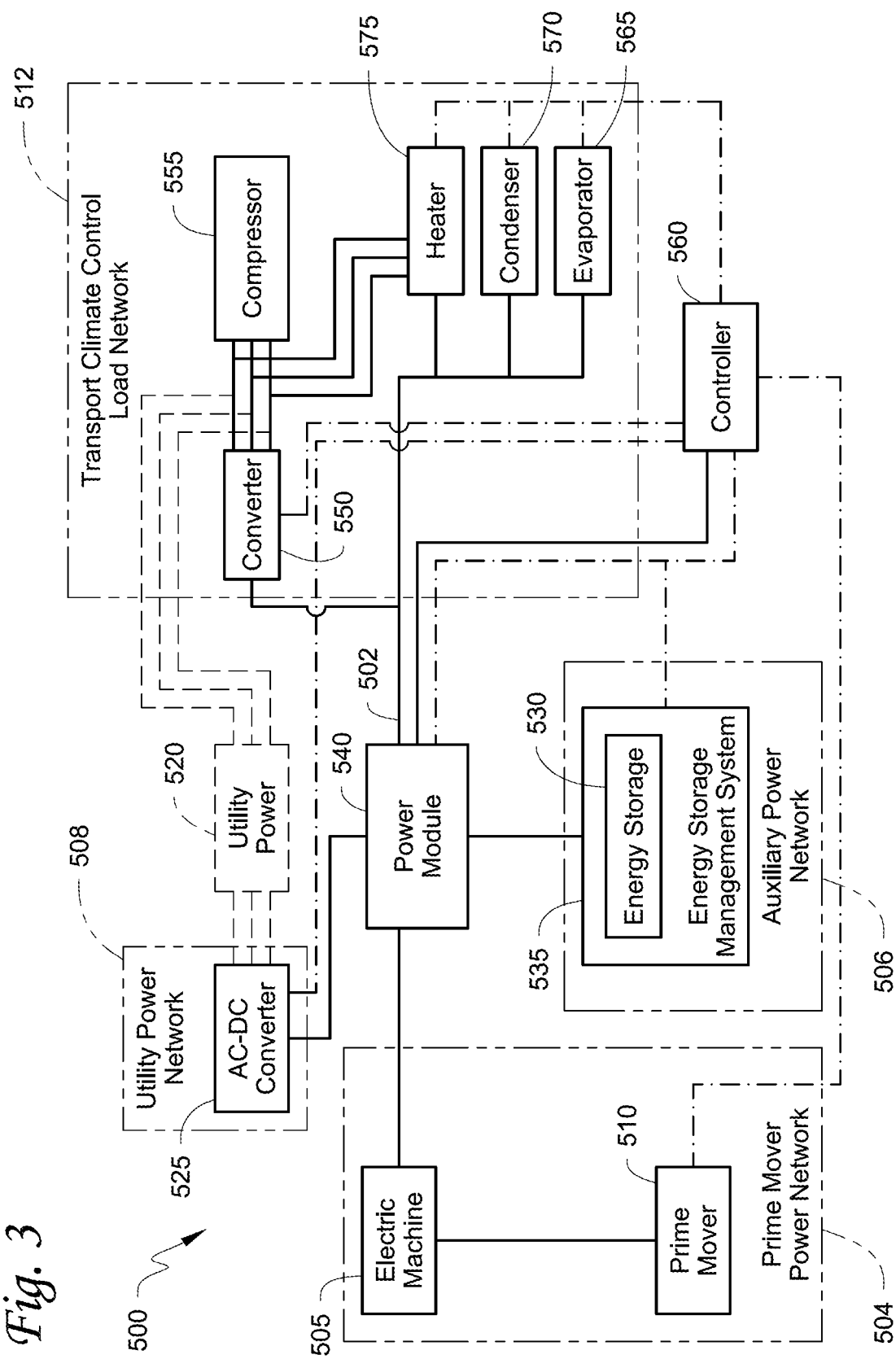

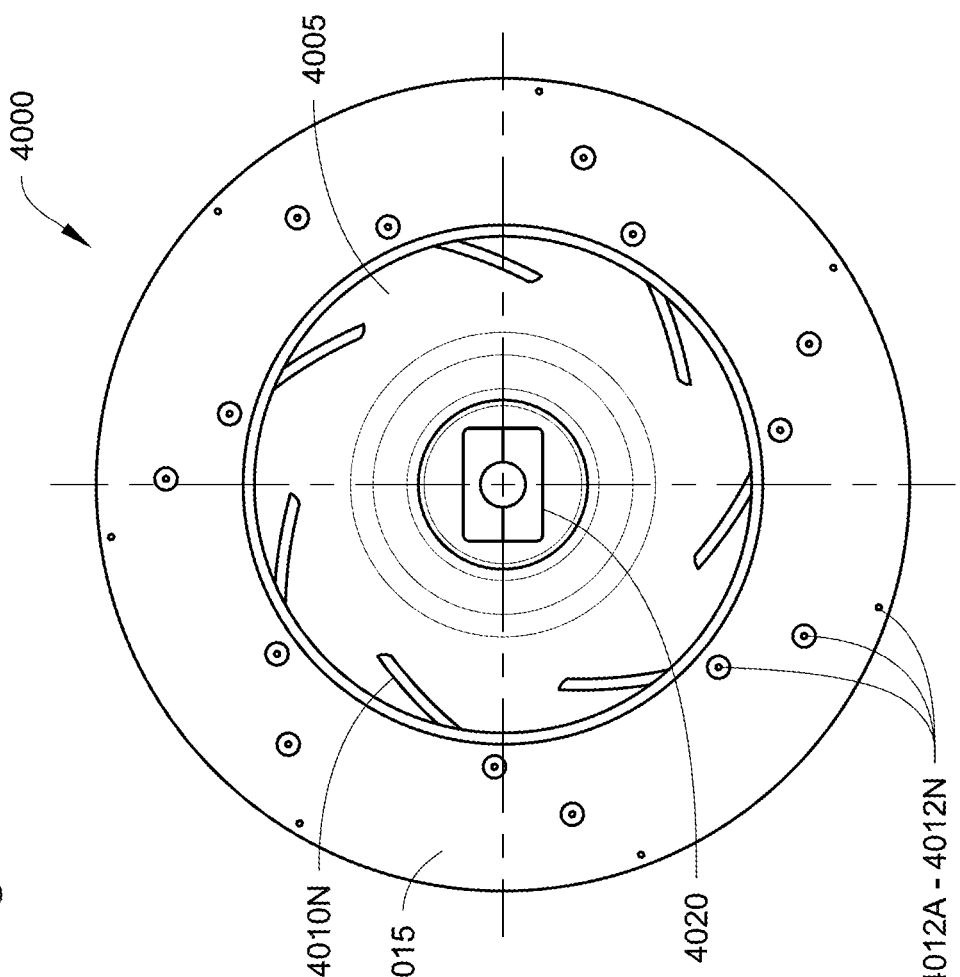
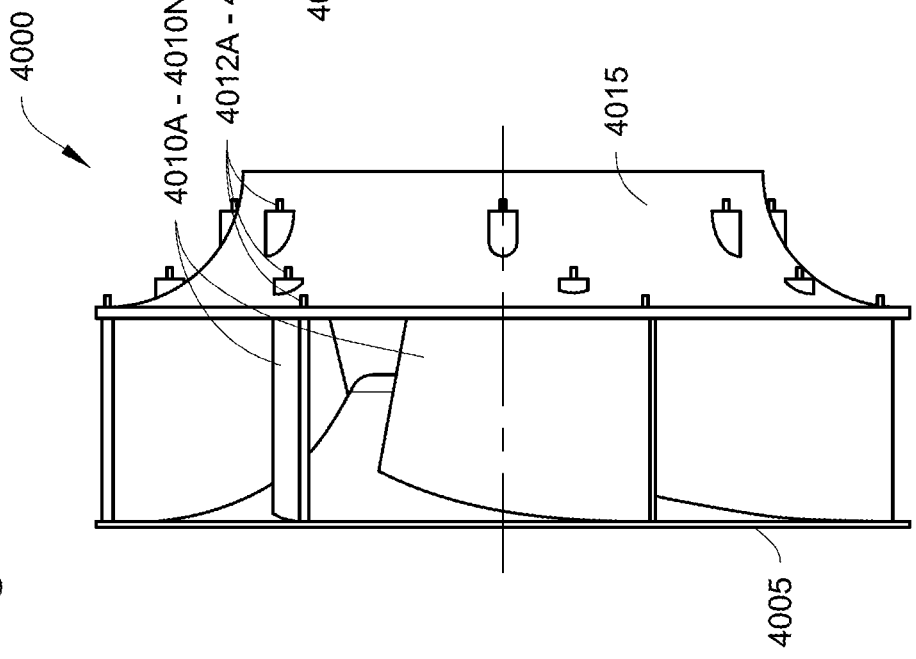

HIGH EFFICIENCY CENTRIFUGAL BLOWER

FIELD

This disclosure relates generally to a transport climate control system. More specifically, this disclosure relates to a centrifugal blower that contributes to supplying climate controlled air passing over, for example, an evaporator into the climate controlled space of a climate controlled transport unit.

BACKGROUND

A transport climate control system is generally used to control one or more environmental conditions such as, but not limited to, temperature, humidity, air quality, or combinations thereof, of a transport unit, examples of which include, but are not limited to a truck, a container (such as a container on a flat car, an intermodal container, a marine container, a rail container, etc.), a box car, a semi-tractor, a bus, etc. One or more centrifugal blowers may be provided in such a system to, e.g., control the heat exchange between the air within the climate-controlled space and the ambient air outside of the climate controlled transport unit.

SUMMARY

This disclosure relates generally to a centrifugal blower that may be included in a transport climate control system to control the heat exchange between the air within the climate controlled space and the ambient air outside of the refrigerated transport unit.

In accordance with at least one example embodiment, a centrifugal blower includes a saucer-shaped blower base, multiple blades fastened to the blower base; and a casing to provide surrounding coverage to the multiple blades with a 25 mm clearance, with a +/− variance of 10%, between a tip of each of the multiple blades and an internal surface of a top of the casing. Each of the multiple blades is trimmed near a leading edge thereof to create a slant face to provide clearance for servicing from an upper portion of the casing, with the top of the casing removed, to the blower base, and the casing is disposed within the centrifugal blower. The centrifugal blower is housed within an evaporator.

In accordance with at least one other example embodiment, a centrifugal blower includes a saucer-shaped blower base; multiple blades fastened to the blower base, and a casing to provide surrounding coverage to the multiple blades with a 25 mm clearance, with a +/− variance of 10%, between a tip of each of the multiple blades and an internal surface of a top of the casing. A chord length of each of the blades is 171 mm, a stagger angle for each of the blades is 30°, and a leading edge camber angle for each of the blades is 20°. The casing is disposed within the centrifugal blower, and the centrifugal blower is housed within an evaporator.

In accordance with the embodiments described and recited herein, by customizing parameters of the blades of a centrifugal blower, the centrifugal blower may operate within the context of a known, static design to operate at speeds lower than known implementations, thus reducing power requirements without suffering from a loss of efficiency.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different FIGs. indicates similar or identical items.

FIG. 1B is a side view of a truck with a transport climate control system, according to at least one embodiment described and recited herein.

FIG. 3 shows a block diagram of a power system for powering a transport climate control system, according to at least one embodiment described and recited herein.

FIGS. 4A-1 and 4A-2 show components of a centrifugal blower, according to at least one embodiment described and recited herein. FIG. 4A-1 shows a side view of centrifugal blower 4000, and FIG. 4A-2 shows a front view of centrifugal blower 4000.

FIGS. 4B-1 and 4B-2 show components of a fan assembly of a centrifugal blower, according to at least one embodiment described and recited herein. FIG. 4B-1 shows a front view of the fan assembly, and FIG. 4B-2 shows a rear view of the fan assembly.

FIGS. 4C-1 and 4C-2 show components of a shroud of a centrifugal blower, according to at least one embodiment described and recited herein. FIG. 4C-1 shows a bottom view of the shroud, and FIG. 4C-2 shows a top view of the shroud.

FIG. 5A shows components of a singular fan blade of the centrifugal blower, and FIG. 5B shows a configuration of a blade as removably fastened to a blower base.

DETAILED DESCRIPTION

Figure 1A:
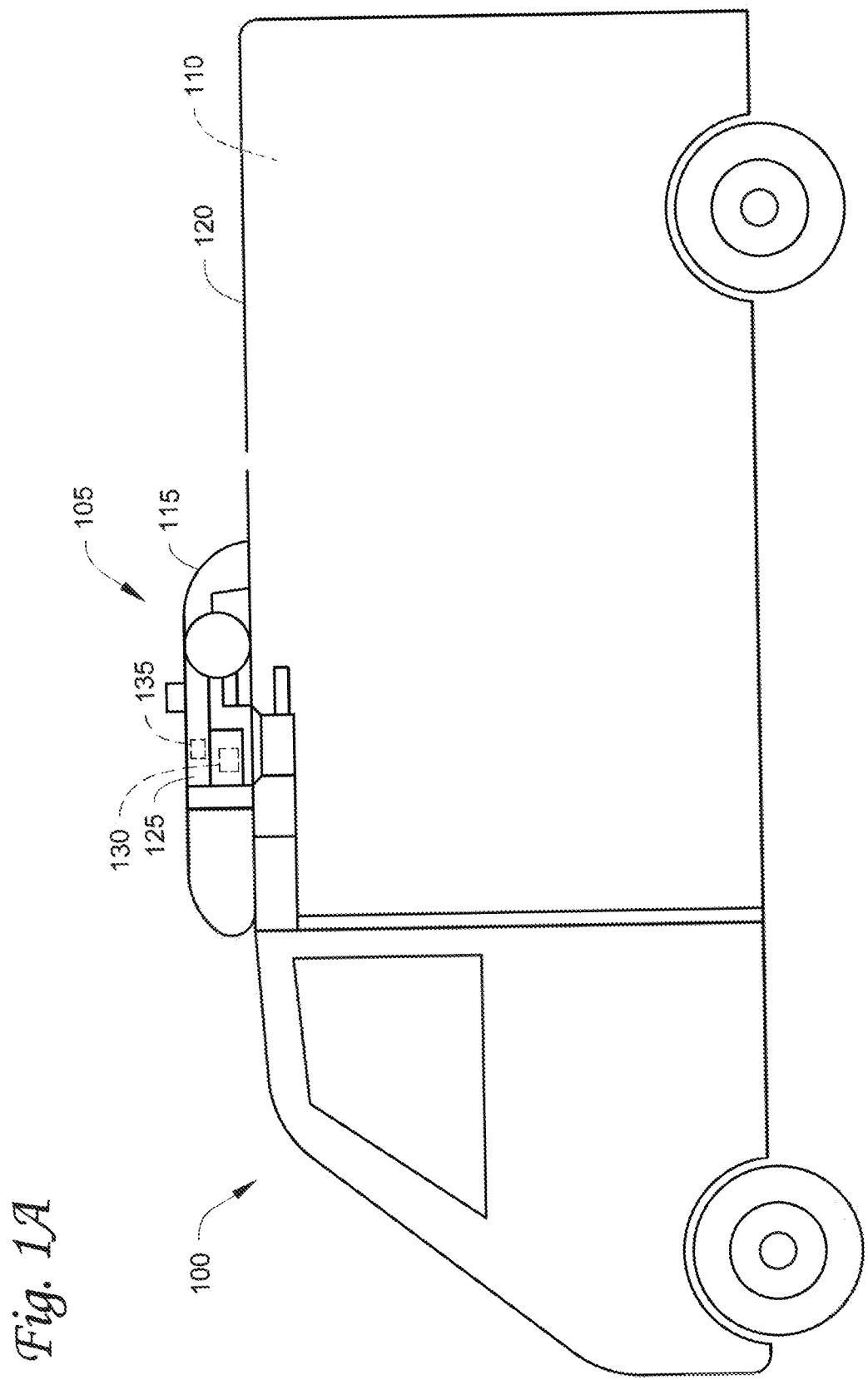
FIG. 1A a side view of a van with a transport climate control system, according to at least one embodiment described and recited herein.

This disclosure relates generally to a transport climate control system. More specifically, this disclosure relates to a centrifugal blower that can be used, for example, with an evaporator to supply climate controlled air passing over the evaporator into the climate controlled space of a climate controlled transport unit.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In the present description and recitation, the following terms may be used, in addition to their accepted meaning, as follows:

A transport climate control system may control one or more environmental conditions within a transport unit that include but are not limited to temperature, humidity, air quality, or combinations thereof. Non-limiting examples of a transport unit may include, but not be limited to, a truck, a container (such as a container on a flat car, an intermodal container, a marine container, a rail container, etc.), a box car, a semi-tractor, a bus, or other similar transport unit. A refrigerated transport unit is commonly used to transport perishable items such as pharmaceuticals, produce, frozen foods, and meat products.

A climate controlled transport unit, e.g., a transport unit including a climate control system, may be used to transport perishable items including, but not limited to, produce, frozen foods, meat products, dairy products, etc.

A climate control system is generally used to control one or more environmental conditions such as, but not limited to, temperature, humidity, and/or air quality of a transport unit. A climate control system may include, for example, one or more of a refrigeration system to control the refrigeration of a climate controlled space of a refrigerated transport unit; a vapor-compressor type refrigeration system, a thermal accumulator type system, or any other suitable refrigeration system that may use refrigerant, cold plate technology, etc.

A climate control system may further include a climate control unit (CCU) attached to a transport unit to control one or more environmental conditions (e.g., temperature, humidity, air quality, etc.) of a climate controlled space of the refrigerated transport unit. The CCU may include, without limitation, one or more of a compressor, a condenser, an expansion valve, an evaporator, and one or more fans or blowers to control the heat exchange between the air within the climate controlled space and the ambient air outside of the refrigerated transport unit.

Figure 1C:
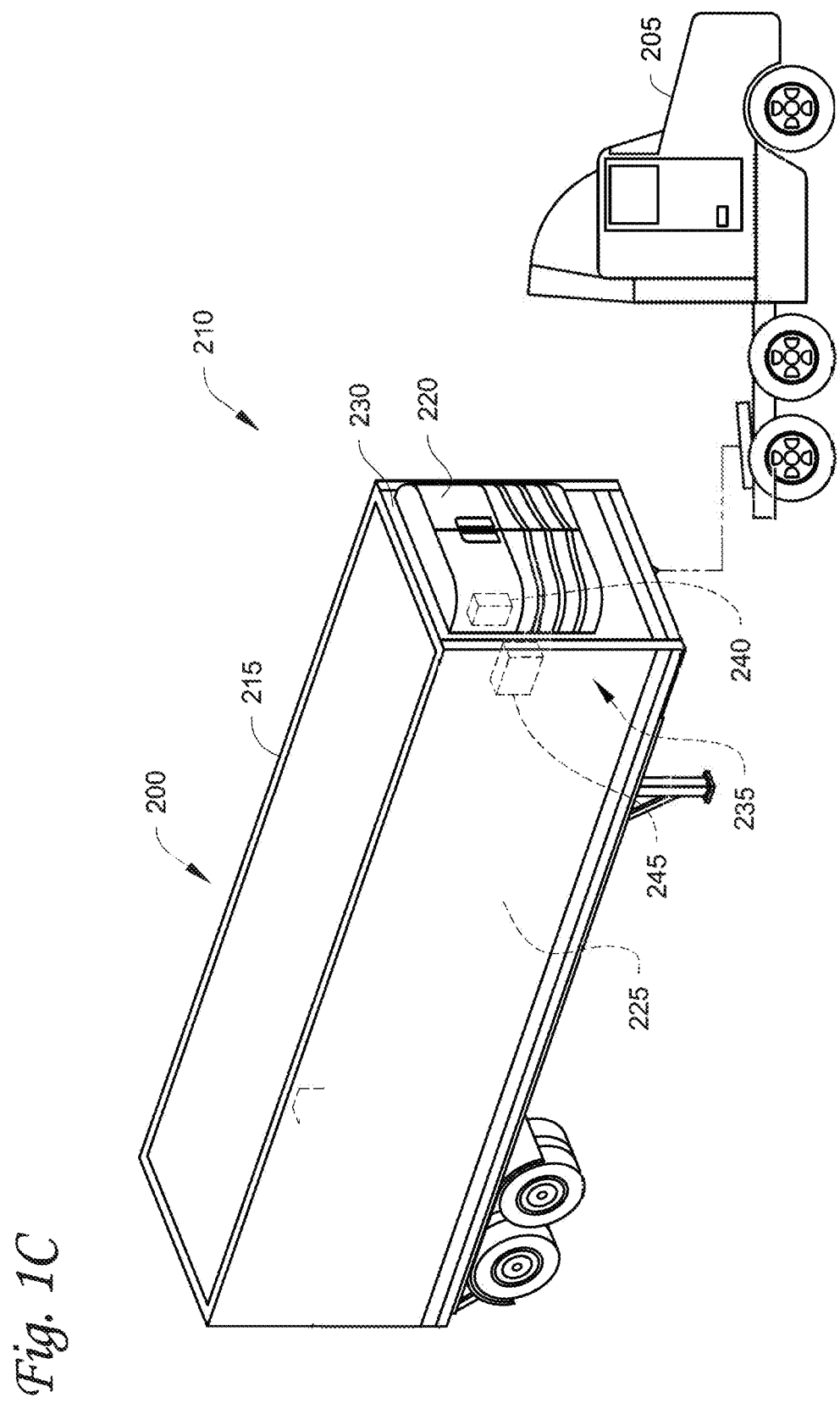
FIG. 1C is a perspective view of a climate controlled transport unit, according to at least one embodiment described and recited herein.
Figure 1D:
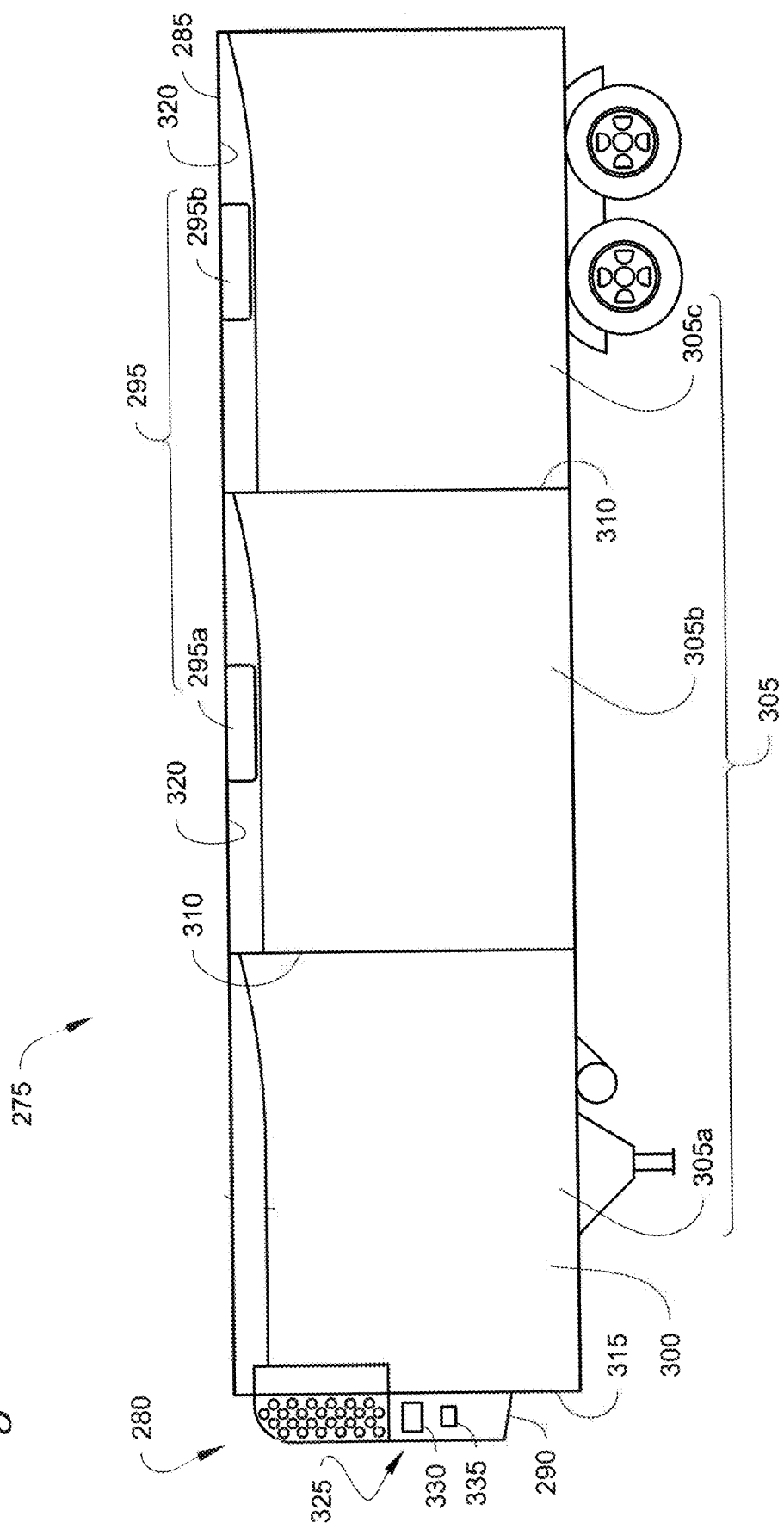
FIG. 1D is a side view of a climate controlled transport unit including a multi-zone transport climate control system, according to at least one embodiment described and recited herein.

FIGS. 1A-1D show various transport climate control systems. FIG. 1A is a side view of a van 100 with a transport climate control system 105, in accordance with one or more embodiments described and recited herein. FIG. 1B is a side view of a truck 150 with a transport climate control system 155, in accordance with one or more embodiments described and recited herein. FIG. 1C is a perspective view of a climate controlled transport unit 200 attachable to a tractor 205, in accordance with one or more embodiments described and recited herein. FIG. 1D is a side view of a climate controlled transport unit 275 including a multi-zone transport climate control system 280, in accordance with one or more embodiments described and recited herein. It will be appreciated that the embodiments described are not limited to the transport units shown in FIGS. 1A-1D, but may apply to any type of transport unit (e.g., a truck, a container (such as a container on a flat car, an intermodal container, a marine container, a rail container, etc.), a box car, a semi-tractor, a bus, or other similar transport unit), within the scope of the principles of this disclosure.

FIG. 1A depicts the van 100 having the climate control system 105 for providing climate control within a climate controlled space 110. The transport climate control system 105 includes a climate control unit (CCU) 115 that is mounted to a rooftop 120 of the van 100. In accordance with one or more embodiments described and recited herein, the CCU 115 may be a transport refrigeration unit.

The CCU 115 may include, among other components, a climate control circuit that connects, for example, a compressor, a condenser, an evaporator, and an expansion device (e.g., an expansion valve) to provide climate control within the climate controlled space 110. In some embodiments, the CCU 115 may include one or more fans or blowers (e.g., axial fan(s), centrifugal blower(s), etc.) to push air that has passed over the condenser out of the CCU 115. Also, in some embodiments, the CCU 115 may include one or more fans or blowers (e.g., axial fan(s), centrifugal blower(s), etc.) to blow conditioned air that has passed over the evaporator into the climate controlled space 110.

The transport climate control system 105 may also include a programmable climate controller 125 and one or more climate control sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors may be positioned at various locations outside the van 100 and/or inside the van 100 (including within the climate controlled space 110).

The climate controller 125 may be configured to control operation of the transport climate control system 105 including the components of the climate control circuit. The climate controller 115 may include a single integrated control unit 130 or may include a distributed network of climate controller elements 130, 135. The number of distributed control elements in a given network may depend upon the particular application of the principles of this disclosure. The measured parameters obtained by the one or more climate control sensors may be used by the climate controller 125 to control operation of the climate control system 105.

FIG. 1B depicts the climate-controlled straight truck 150 that includes the climate controlled space 160 for carrying cargo and the transport climate control system 155. The transport climate control system 155 includes a CCU 165 that is mounted to a front wall 170 of the climate controlled space 160. The CCU 165 may include, among other components, a climate control circuit that connects, for example, a compressor, a condenser, an evaporator, and an expansion device to provide climate control within the climate controlled space 160. In accordance with one or more embodiments described and recited herein, the CCU 165 may be a transport refrigeration unit.

In some embodiments, the CCU 165 may include an axial fan to push air that has passed over the condenser out of the CCU 165. Also, in some embodiments, the CCU 165 may include a centrifugal blower to blow conditioned air that has passed over the evaporator into the climate controlled space 160.

The transport climate control system 155 may also include a programmable climate controller 175 and one or more climate control sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate climate control data to the climate controller 175. The one or more climate control sensors may be positioned at various locations outside the truck 150 and/or inside the truck 150 (including within the climate controlled space 160).

The climate controller 175 may be configured to control operation of the transport climate control system 155 including components of the climate control circuit. The climate controller 175 may include a single integrated control unit 175 or may include a distributed network of climate controller elements 175, 180. The number of distributed control elements in a given network may depend upon the particular application of the principles described herein. The measured parameters obtained by the one or more climate control sensors may be used by the climate controller 175 to control operation of the climate control system 155.

FIG. 1C illustrates one embodiment of the climate controlled transport unit 200 attached to a tractor 205. The climate controlled transport unit 200 includes a transport climate control system 210 for a transport unit 215. The tractor 205 is attached to and may be configured to tow the transport unit 215. The transport unit 215 shown in FIG. 1C is a trailer.

The transport climate control system 210 may include, among other components, a CCU 220 that provides environmental control (e.g. temperature, humidity, air quality, etc.) within a climate controlled space 225 of the transport unit 215. The CCU 220 is disposed on a front wall 230 of the transport unit 215. In at least one or more other embodiments, the CCU 220 may be disposed, for example, on a rooftop or another wall of the transport unit 215. The CCU 220 includes a climate control circuit that connects, for example, a compressor, a condenser, an evaporator, and an expansion device to provide conditioned air within the climate controlled space 225. In accordance with one or more embodiments described and recited herein, the CCU 220 may be a transport refrigeration unit.

In some embodiments, the CCU 220 may include an axial fan to push air that has passed over the condenser out of the CCU 220. Also, in some embodiments, the CCU 220 may include a centrifugal blower to blow conditioned air that has passed over the evaporator into the climate controlled space 225.

The transport climate control system 210 may also include a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors may be positioned at various locations outside the transport unit 200 and/or inside the transport unit 200 (including within the climate controlled space 225).

The climate controller 235 may be configured to control operation of the transport climate control system 210 including components of the climate control circuit. The climate controller 235 may include a single integrated control unit 240 or may include a distributed network of climate controller elements 240, 245. The number of distributed control elements in a given network may depend upon the particular application of the principles described herein. The measured parameters obtained by the one or more climate control sensors may be used by the climate controller 235 to control operation of the climate control system 210.

FIG. 1D illustrates an embodiment of the climate controlled transport unit 275. The climate controlled transport unit 275 includes the multi-zone transport climate control system (MTCS) 280 for a transport unit 285 that may be towed, for example, by a tractor (not shown). It will be appreciated that the embodiments described herein are not limited to tractor and trailer units, but may apply to any type of transport unit (e.g., a truck, a container (such as a container on a flat car, an intermodal container, a marine container, a rail container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The climate controlled space 300 may be divided into a plurality of zones 305. The term "zone" means a part of an area of the climate controlled space 300 separated by walls 310. The CCU 290 may operate as a host unit and provide climate control within a first zone 305a of the climate controlled space 300. The remote unit 295a may provide climate control within a second zone 305b of the climate controlled space 300. The remote unit 295b may provide climate control within a third zone 305c of the climate controlled space 300. Accordingly, the MTCS 280 may be used to separately and independently control environmental condition(s) within each of the multiple zones 305 of the climate controlled space 300.

The CCU 290 is disposed on a front wall 315 of the transport unit 275. In one or more other embodiments, the CCU 290 may be disposed, for example, on a rooftop or another wall of the transport unit 275. The CCU 290 includes a climate control circuit that connects, for example, a compressor, a condenser, an evaporator, and an expansion device to provide conditioned air within the climate controlled space 300. The remote unit 295a is disposed on a ceiling 320 within the second zone 305b and the remote unit 295b is disposed on the ceiling 320 within the third zone 305c. Each of the remote units 295a and 295b includes an evaporator that connects to the rest of the climate control circuit provided in the CCU 290. In accordance with one or more embodiments described and recited herein, the CCU 290 may be a transport refrigeration unit.

In some embodiments, the CCU 290 may include an axial fan to push air that has passed over the condenser out of the CCU 290. Also, in some embodiments, the CCU 290 may include a centrifugal blower to blow conditioned air that has passed over the evaporator into the climate controlled space 300.

The MTCS 280 may also include a programmable climate controller 325 and one or more climate control sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295*a* or 295*b*, a humidity within each of the zones 305, etc.) and communicate climate control data to a climate controller 325. The one or more climate control sensors may be positioned at various locations outside the transport unit 275 and/or inside the transport unit 275 (including within the climate controlled space 300).

The climate controller 325 may be configured to control operation of the MTCS 280 including components of the climate control circuit. The climate controller 325 may include a single integrated control unit 330 or may include a distributed network of climate controller elements 330, 335. The number of distributed control elements in a given network may depend upon the particular application of the principles described herein. The measured parameters obtained by the one or more climate control sensors may be used by the climate controller 325 to control operation of the MTCS 280.

Figure 2:
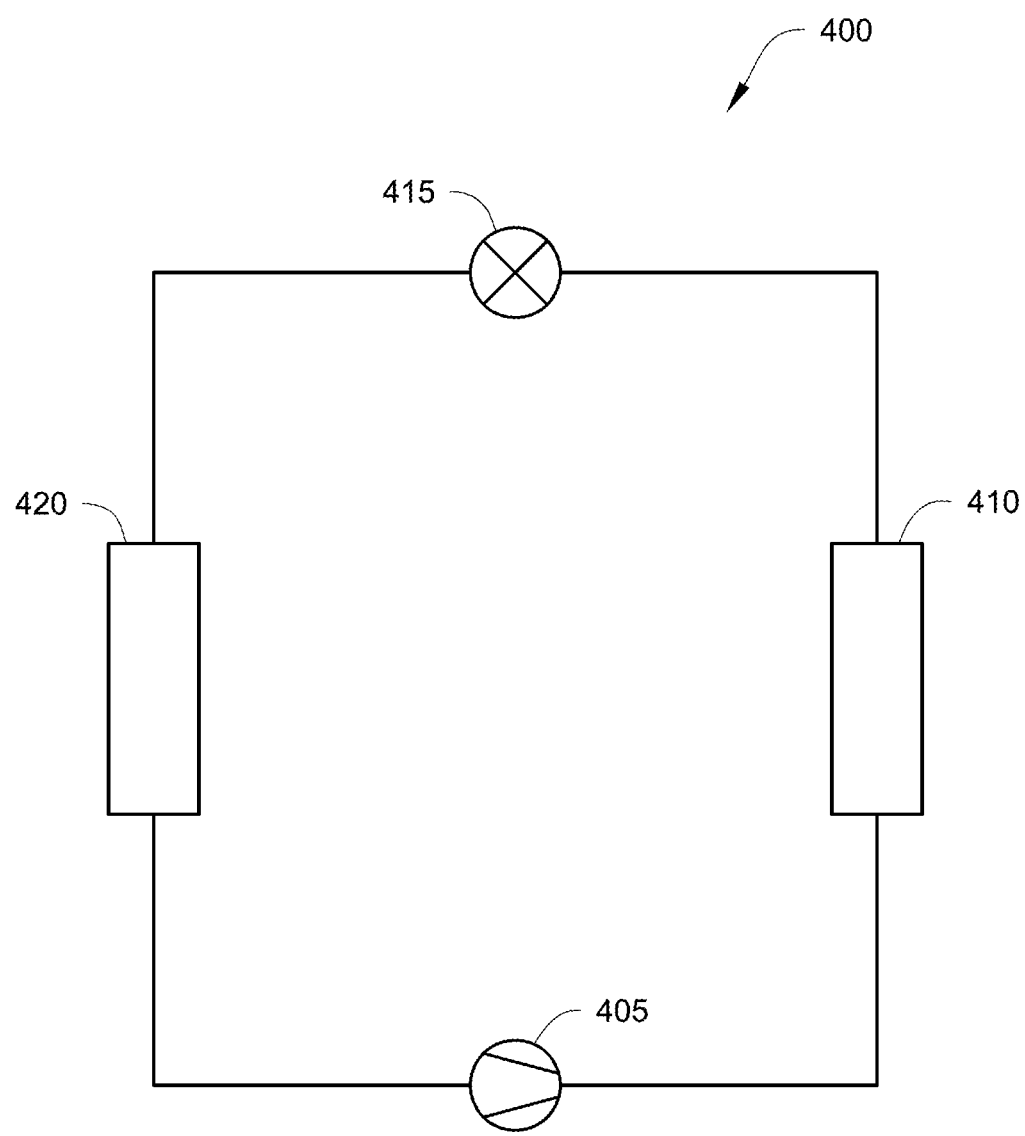
FIG. 2 shows a schematic diagram of a climate control circuit, according to at least one embodiment described and recited herein.

FIG. 2 is a schematic diagram of a climate control circuit 400, according to at least one or more embodiments described and recited herein. The climate control circuit 400 generally includes a compressor 405, a condenser 410, an expansion device 415, and an evaporator 420. The compressor 405 may be, for example, a scroll compressor, a reciprocal compressor, etc. In some embodiments, the compressor 405 may be a mechanically driven compressor. In one or more other embodiments, the compressor 405 may be an electrically driven compressor.

The climate control circuit 400 is exemplary and may be modified to include additional components. For example, in some embodiments the climate control circuit 400 may include an economizer heat exchanger, one or more flow control devices (e.g., valves, etc.), a receiver tank, a dryer, a suction-liquid heat exchanger, etc.

The climate control circuit 400 may generally be applied in a variety of systems used to control an environmental condition (e.g., temperature, humidity, air quality, etc.) in a space (generally referred to as a climate controlled space). Examples of such systems may include, as non-limiting examples, the climate control systems shown and described above with regard to FIGS. 1A-1D.

The components of the climate control circuit 400 may be fluidly connected. The climate control circuit 400 may be configured to be a cooling system (e.g., an air conditioning system) capable of operating in a cooling mode. Alternatively, the climate control circuit 400 may be configured to be a heat pump system, capable of operating in both a cooling mode and a heating/defrost mode.

Climate control circuit 400 may be configured to heat or cool heat transfer fluid or medium (e.g., a gas), in which case the climate control circuit 400 may be generally representative of an air conditioner or heat pump.

In operation, the compressor 405 compresses a heat transfer fluid (e.g., refrigerant, etc.) from a relatively lower pressure gas to a relatively higher-pressure gas. The relatively higher-pressure and higher temperature gas is discharged from the compressor 405 and flows through the condenser 410. As is known, the heat transfer fluid flows through the condenser 10 and rejects heat to a heat transfer fluid or medium (e.g., air, etc.), thereby cooling the heat transfer fluid. The cooled heat transfer fluid, which is now in a liquid form, flows to the expansion device 415 (e.g., an expansion valve, etc.). The expansion device 415 reduces the pressure of the heat transfer fluid. As a result, a portion of the heat transfer fluid is converted to a gaseous form. The heat transfer fluid, which is now in a mixed liquid and gaseous form flows to the evaporator 420. The heat transfer fluid flows through the evaporator 420 and absorbs heat from a heat transfer medium (e.g., air, etc.), heating the heat transfer fluid, and converting it to a gaseous form. The gaseous heat transfer fluid then returns to the compressor 405. The above-described process continues while the heat transfer circuit is operating, for example, in a cooling mode (e.g., while the compressor 405 is enabled).

It will be appreciated that the evaporator 420 can be combined with a centrifugal blower that is configured to facilitate heat exchange by blowing air passing over the evaporator 420 into a climate controlled space. Also, the condenser 410 can be combined with an axial fan that is configured to facilitate heat exchange by pushing air passing over the condenser 410 out of a CCU.

FIG. 3 illustrates a block diagram schematic of one embodiment of a power system 500 for powering a transport climate control system (e.g., the transport climate control systems 105, 155, 210, 280 shown in FIGS. 1A-1D). The power system 500 includes a prime mover power network 504, an auxiliary power network 506, a utility power network 508, and a transport climate control load network 512 connected to a power module 540. In accordance with one or more alternative embodiments, the power system 500 may include one or more of the prime mover power network 504, the auxiliary power network 506, and/or the utility power network 508. For example, in at least one embodiment, the power system 500 includes the prime mover power network 504, without the auxiliary power network 506 and/or the utility power network 508. In at least one other embodiment, the power system 500 includes the prime mover power network 504 and the utility power network 508, without the auxiliary power network 506. The power system 500 may use one or more of the prime mover power network 504, the auxiliary power network 506 and the utility power network 508 at any given time to provide power to the transport climate control load network 512. While the power system 500 may be configured to be a hybrid power system that is powered by the prime mover power network 504 in combination with the auxiliary power network 506 and/or the utility power network 508. However, the embodiments described herein may be used with a fully electric power system that does not include a prime mover or prime mover power network to provide power to the transport climate control system.

The prime mover power network 504 includes a prime mover 510 and an electric machine 505 that may provide electric power to the power module 540. The prime mover 510 may be configured to generate mechanical power and the electric machine 510 may be configured to convert the mechanical power to electric power. The generated electric power is then sent by the prime mover power network 505 to the power module 540. In some embodiments, the prime mover 510 may be a vehicle prime mover used to move the vehicle that also provides power to the transport climate control load network 512 when available. Mechanical power generated by the prime mover 510 that may be used in the system 500 may be inconsistent and based on operation and vehicle load requirements of the vehicle. In other embodiments, the prime mover 510 and the electric machine 505 may be part of a generator set that provides power to the transport climate control load network 512. In yet further embodiments, the prime mover 510 and the electric machine 505 may be part of a CCU (e.g., the CCU 115, 165, 220, 290 shown in FIGS. 1A-D) to provide power to the transport climate control load network 512. In some embodiments the maximum power available from the prime mover power network 504 may never be sufficient to operate the transport climate control system operating at a full capacity.

In some embodiments, the electric machine 505 may be an electrical generator that may provide DC power to the transport climate control load network 512. In other embodiments, the electric machine 505 may include an alternator and a rectifier or an AC-DC converter (not shown) that rectifies or converts the AC power generated by the electric machine 505 to a DC power.

For an electric vehicle, there may be no prime mover 510. The electric machine 505 may be a motor generator that is used with a high voltage (e.g., in a range between 60V and 1500V; for example 400V, 800V, etc.) DC battery to run the vehicle. Electric vehicles may also provide a relatively high voltage (e.g., 400V, 800V, etc.) DC power source (e.g., a battery pack, a rechargeable energy storage system (RESS), etc.). Electric vehicles may include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine 505 may be replaced with a DC-DC converter having similar parameters as the electric machine 505 in order to be able to provide prime mover network power to the power module 540.

In some embodiments, the electric machine 505 may provide a low voltage (e.g. 12V) from the prime mover power network 504 to the power module 540 for powering the transport climate control load network 512. In other embodiments, an electric vehicle may provide for example, 7 kW-Hour energy from a 45 kW-Hour storage of the prime mover power network 504 to the power module 540 to run the transport climate control load network 512. In still further embodiments, the prime mover power network 504 may use take off power (e.g., electric power take off or ePTO) from the low voltage (for example, 12V) system for loads such as the power module 540. The high voltage power may provide power for driving the vehicle (e.g., transmission power take off) and the power system 500 but may not take electric power from the high voltage system.

For a hybrid vehicle, there may be a machine (such as the electric machine 505) and/or a low voltage DC power source that may provide a low voltage (e.g., 12V) to the power module 540.

Any type of power source may provide power to the power system 500 and may be part of the prime mover power network 504. This may include, for example, the electric machine 505, a battery, a RESS, a generator, an axle-mounted generator, a power take off (PTO) device or ePTO device with an auxiliary converter, etc.

The auxiliary power network 506 includes an energy storage source 530 and an energy storage management system 535. In some embodiments, the auxiliary power network 506 may be part of the transport climate control system and potentially housed within a CCU. In other embodiments, the auxiliary power network 506 may be external to the transport climate control system and part of the prime mover power network 504. In yet further embodiments, the auxiliary power network 506 may be external to the transport climate control system and external to the prime mover power network 504.

In some embodiments, the energy storage source 530 may include one or more batteries. For example, in at least one embodiment the energy storage source 530 may include two batteries (not shown). Each battery may also be connected to the power module 540. The energy storage source 530 may provide sufficient energy to power the transport climate control load network 512 by itself. In some embodiments, the energy storage source 530 may provide 12 VDC or 24 VDC. In other embodiments, the energy storage source 530 may provide 48 VDC.

The energy storage management system 535 may be configured to monitor a charge level of one or more batteries of the energy storage source 530 and charge the one or more batteries of the energy storage source 530. The energy storage management system 535 may communicate with, for example, the controller 560 and/or a controller (not shown) of the power module 540 to provide a charge level of one or more batteries of the energy storage source 530. Also, the energy storage management system 535 may receive instructions from, for example, the controller 560 and/or the controller of the power module 540 indicating the amount of power from the energy storage source 530 should be supplied to the power module 540.

In other embodiments, the energy storage management system 535 may be configured to monitor other parameters (e.g., monitor the fuel levels for an engine-driven system) and communicate the monitored data with, for example, the controller 560 and/or a controller (not shown) of the power module 540.

The power module 540 may be configured to convert a power from both of the prime mover power network 504 and the auxiliary power network 506 to a load power compatible with one or more loads of the transport climate control load network 512. The power module 540 may include a high power module (not shown) and a low power module (not shown) that is discussed in more detail below. That is, the power module 540 may be configured to buck or boost power from the prime mover power network 504 and may be configured to buck or boost power from the auxiliary power network 506 to obtain the desired load power. In accordance with at least some embodiments described and recited herein, the power module 540 may include one or more DC/DC converters. For example, the power module 540 may include one DC/DC converter to convert the power generated by the prime mover power network 504 and/or the auxiliary power network 506 to a voltage compatible with one or more loads of the transport climate control load network 512 and a second DC/DC converter to convert the auxiliary network power to a voltage compatible with one or more loads of the transport climate control load network 512. The converted power from the prime mover power network 504 and the converted power from the auxiliary power network 506 are combined to obtain a load power compatible with one or more loads of the transport climate control load network 512. The load power outputted by the power module 540 may then be provided on a load DC bus 502 to the transport climate control load network 512. In at least one or more embodiments, the load power may be a low voltage DC power (e.g., between 0-60V DC). In other alternative embodiments, the load power may be a high voltage DC power (e.g., between 60-1500V DC).

In accordance with at least some embodiments described and recited herein, the power module 540 may include a controller (not shown) configured to monitor and control the power module 540. In some alternative embodiments, the controller may communicate with the controller 560.

The power system 500, and particularly the power module 540, is controlled by the controller 560 of the transport climate control load network 512. The controller 560 may be, for example, the controller 125, 175, 235, 325 shown in FIGS. 1A-D. In some embodiments described and recited herein, the power module 540 may monitor the amount of current and/or voltage provided by the prime mover power network 504. Also, in at least some alternative embodiments, the power module 540 may monitor the amount of current and/or voltage drawn by components of the transport climate control load network 512. The power module 540 may be configured to communicate the amount of current and/or voltage provided by the prime mover power network 504 and the amount of current and/or voltage drawn by components of the transport climate control load network 512.

Components of the transport climate control load network 512 may be, for example, part of a CCU that is mounted to the body of the vehicle (for example, truck, van, etc.). In some embodiments, the CCU may be above the cab of the truck (as shown in FIG. 1B). In one or more alternative embodiments, the CCU may be on the top of the TU (for example, a top of a box where the external condensers are located) (see FIG. 1C). In one or more other embodiments, the components of the transport climate control load network 512 may be DC powered components. In one or more other embodiments, the components of the transport climate control load network 512 may be AC powered components. Alternatively, the transport climate control load network 512 may include both DC powered components and AC powered components.

As shown in FIG. 3, the transport climate control load network 512 includes at least one compressor 555, one or more evaporator blowers 565, one or more condenser fans 570, the heater 575, and the controller 560. It will be appreciated that in some embodiments, the transport climate control load network 512 does not include the heater 575. It will also be appreciated that in some embodiments, the transport climate control load network 512 does not include the at least one compressor 555. It will further be appreciated that in some embodiments, the transport climate control load network 512 may include thermal management of batteries, power electronics, etc. The transport climate control load network 512 also includes an inverter 550 that may be configured to boost the load power and convert the boosted load power to an AC load power. That is, the inverter 550 may be configured to boost power from the DC load bus 502 and converts the power to AC power to drive the compressor 555. In some embodiments, the inverter 550 may convert the load power to a high voltage AC power. As shown in FIG. 3, the inverter 550 may be configured to power the compressor 555 and optionally the heater 575. It will be appreciated that in other embodiments, the inverter 550 may power other components of the transport climate control load network 512 such as, for example, the one or more evaporator blowers 565, the one or more condenser fans 570, etc. In some embodiments, the inverter 550 may be a Compressor Drive Module (CDM). Details of an example of a centrifugal blower that can be used as the evaporator blower 565 is discussed in detail below with respect to FIGS. 4-7.

The load DC bus 502 is connected to and powers each of the inverter 550, the one or more evaporator blowers 565, the one or more condenser fans 570, the heater 575, and the controller 560. It will be appreciated that the inverter 550 with the compressor 555 may require the most power of the various loads of the transport climate control load network 512. As shown in FIG. 3, in some embodiments, the inverter 550 may also power the heater 575.

The utility power network 508 may be configured to charge the energy storage source 530 of the auxiliary power network 506 when, for example, the vehicle is parked and has access to a utility power source 520. In some embodiments, the utility power network 508 may also provide power to operate the transport climate control load network 512 when, for example, the vehicle is parked and has access to a utility power source. The utility power network 508 includes the AC-DC converter 525. The utility power source (e.g., shore power, etc.) 520 may be connected to the AC-DC converter 525 to provide AC power input to the AC-DC converter 525. The AC-DC converter 525 may be configured to convert the AC power from the utility power source 520 and to provide converted DC power to the power module 540.

While FIG. 3 shows a single AC-DC converter 525 as part of the utility power network 508, the power system 500 may include two or more AC-DC converters. In embodiments in which there are two or more AC-DC converters, each of the AC-DC converters may be connected to the utility power 520 to provide additional power capacity to the power system 500. In some embodiments, each of the AC-DC converters may provide different amounts of power. In some embodiments, each of the AC-DC converters may provide the same amount of power.

In one or more alternative embodiments, the utility power 520 may be connected directly to the compressor 555 and provide power to drive the compressor 555 thereby bypassing the inverter 550. In one or more other embodiments, the inverter 550 may be used as an AC-DC converter and convert power received from the utility power 520 into DC power that may be provided by the inverter 550 to the load DC bus 502.

In some embodiments, the compressor 555 may be a variable speed compressor. In other embodiments, the compressor 555 may be a fixed speed (e.g., two-speed) compressor. Also, in some embodiments, the heater 575 may be configured to receive power from the inverter 550. While the compressor 555 shown in FIG. 3 is powered by AC power, it will be appreciated that in other embodiments the compressor 555 may be powered by DC power or mechanical power. Further, in some embodiments, the prime mover 510 may be directly connected (not shown) to the compressor 555 to provide mechanical power to the compressor 555.

When the compressor 555 and/or the heater 575 are powered directly by the utility power 520, the compressor 555 and/or the heater 575 may be turned on and off (e.g., operate in a start/stop mode) in order to control the amount of cooling provided by the compressor 555 and/or the amount of heating provided by the heater 575.

The controller 560 may be configured to monitor and control operation of the transport climate control system. In particular, the controller 560 may control operation of the compressor 555, the heater 575, the one or more condenser fans 570, the one or more evaporator blowers 565 and any other components of the vehicle powered transport climate control system. In some embodiments, the controller 560 may monitor the amount of power drawn by the components of the transport climate control load network 512. The controller 560 may also be configured to control the power system 500. The power system 500 may also include one or more sensors (not shown) that are configured to measure one or more power parameters (e.g., voltage, current, etc.) throughout the power system 500 and communicate power parameter data to the controller 560. As shown in FIG. 3, the controller 560 may communicate with all of the components of the transport power system 500 via a communication link.

In some embodiments, the controller 560 may be a distributed controller that includes a main application controller (part of the controller 560), a human machine interface (not shown), a telematics unit (not shown), and the power module 540. As noted above, in some embodiments, the power module 540 may include a high power module and a low power module. It will be appreciated that the high power module, the low power module, the main application controller, the telematics unit and the human machine interface may communicate via one or more communication links using one or more protocols including, for example a Controller Area Network (MAY) communication protocol, RS232 communication protocol, RS485 communication protocol, Bluetooth communication protocol, etc. In some embodiments, the controller 560 may also include other modules including, for example, a telematics unit that may provide wireless network connectivity (e.g., cellular, Bluetooth, etc.) that allows the transport climate control system to be controlled remotely.

Figures 2, 4B:
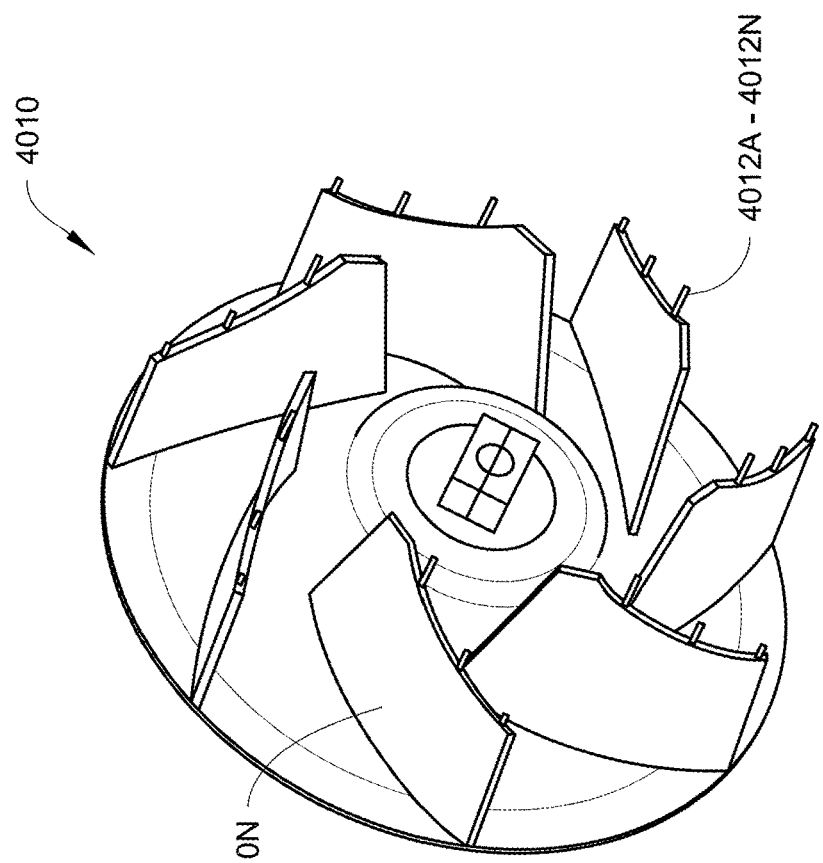
Figures 1, 4B:
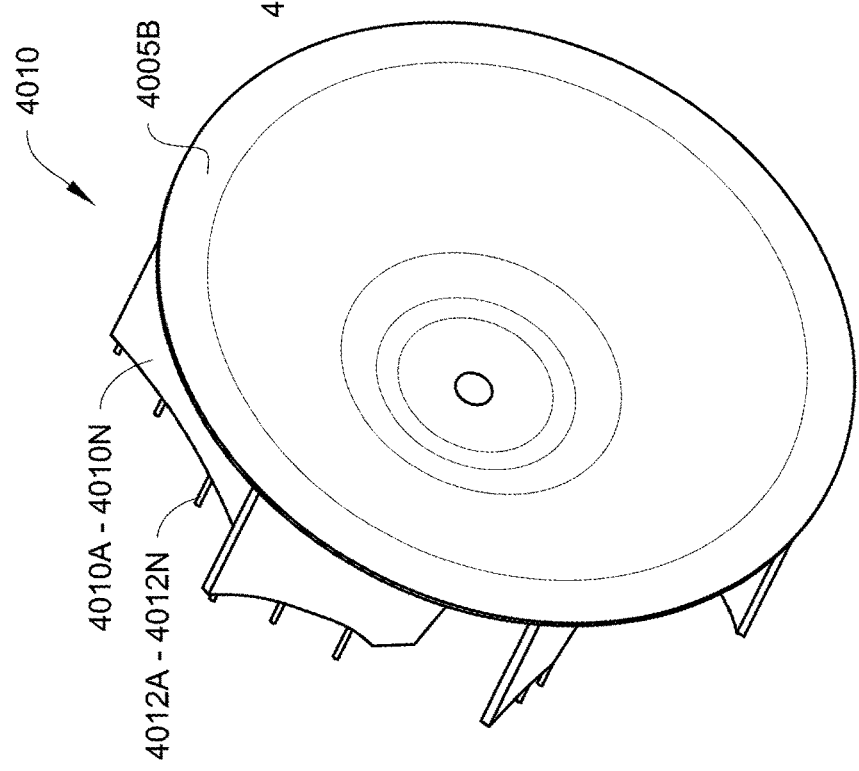

FIGS. 4A-1 and 4A-2 show components of a centrifugal blower 4000 (that may be used, for example, as the centrifugal blower 565 shown in FIG. 3), according to at least one embodiment described and recited herein. FIG. 4A-1 shows a side view of centrifugal blower 4000, and FIG. 4A-2 shows a front view of centrifugal blower 4000.

FIGS. 4B-1 and 4B-2 show components of a fan 4010 assembly of a centrifugal blower, according to at least one embodiment described and recited herein. FIG. 4B-1 shows a front view of fan assembly 4010, and FIG. 4B-2 shows a rear view of fan assembly 4010.

Figures 2, 4C:
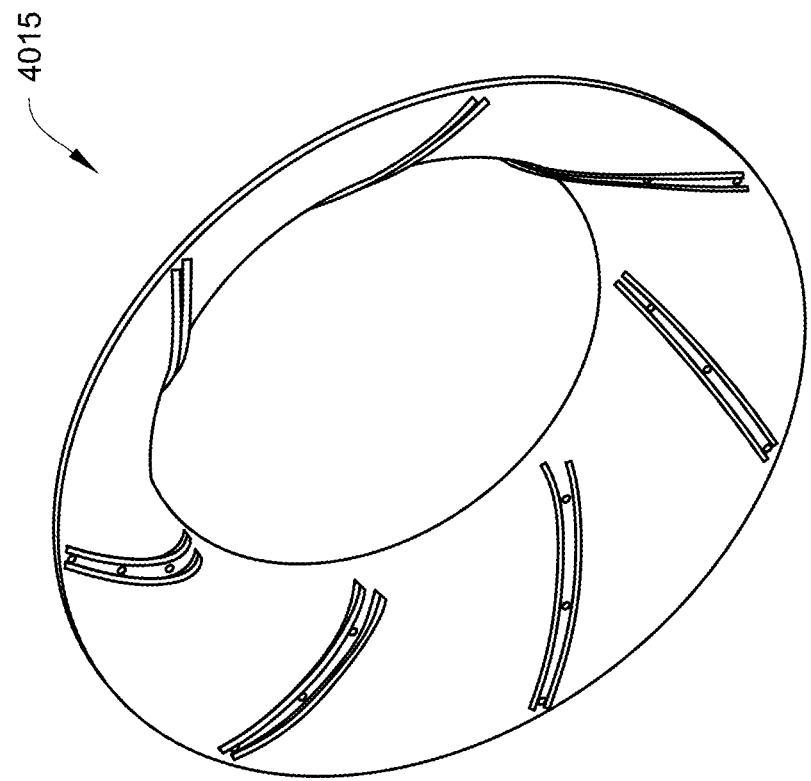
Figures 1, 4C:
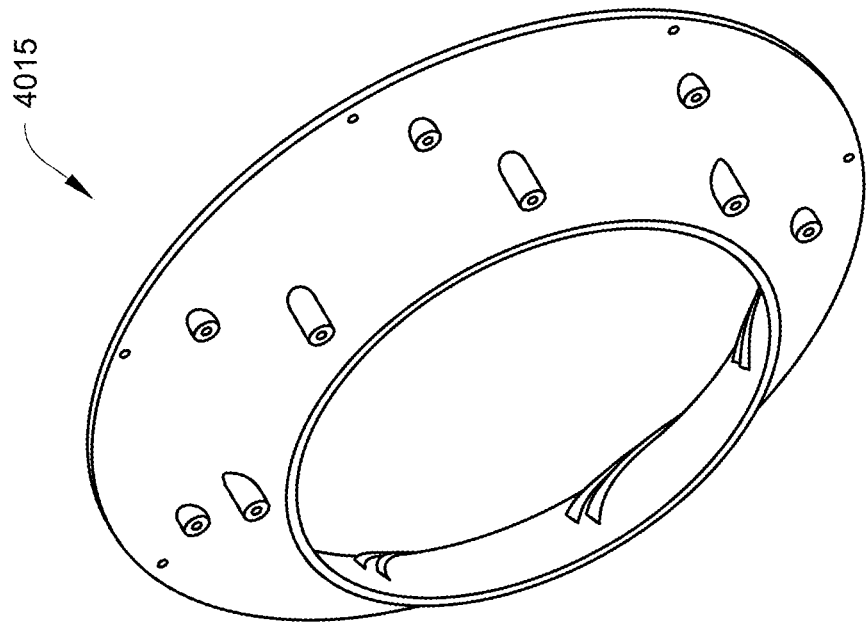

FIGS. 4C-1 and 4C-2 show components of a shroud 4015 of a centrifugal blower, according to at least one embodiment described and recited herein. FIG. 4C-1 shows a bottom view of shroud 4015, and FIG. 4C-2 shows a top view of shroud 4015.

In accordance with at least one example embodiment described and recited herein, centrifugal blower 4000 includes blower base 4005, fan blades 4010A-4010N, shroud 4015, and hub 4020.

Blower base 4005 may be configured as a rotatable component, composed of metal, plastic, or other composite materials, that rotates upon an axial pin within, e.g., evaporator blower 565, described above, to discharge heated gas, e.g., air, from evaporator 420.

A bottom portion 4005B of blower base 4005 may be saucer-shaped, i.e., concave, relative to fan blades 4010A-4010N attached to blower base 4005. Such design of the bottom portion 4005B of blower base 4005 directs gas within e.g., evaporator blower 565 towards fan blades 4010A-4010N for more efficient discharge from evaporator 420.

Fan blades 4010A-4010N, which may be uniformly configured, may also be composed of metal, plastic, or other composite materials, and project vertically from blower base 4005. Blades 4010A-4010N may be removably fastened to blower base 4005 so that, when rotated, the heated gas may be discharged from evaporator 420. The number of blades fastened to blower base 4005 may be variable, hence the blades may be removably fastened thereto. However, in accordance with at least one embodiment described and recited here, blade 4010N may be the seventh blade removably fastened to blower base 4005.

The variable configuration of fan blades 4010A-4010N enables centrifugal blower 400 to operate within a uniform or even standardized casing for evaporator 420. Accordingly, centrifugal blower 4000, as described and recited herein, may operate at operating speeds that are lower than those of typical or currently known implementations while generating an airflow that meets or even exceeds those of the typical or currently known implementations.

Shroud 4015 may be configured to provide surrounding coverage to at least the blades that are fastened to the blower base 4005. Blower base 4005 and shroud 4015 may be split into multiple portions to enable a simple molding injection process. Further, blower base 4005 and shroud 4015 may be fastened together by fasteners, welding, adhesives, heat staking, or riveting pins 4012A-4012N projecting from respective ones of fan blades 4010A-4010N.

Hub 4020 may be integrated to a central portion of blower base 4010 to facilitate installation within e.g., evaporator blower 565 and access to tightening bolts (not shown).

Figure 5A:
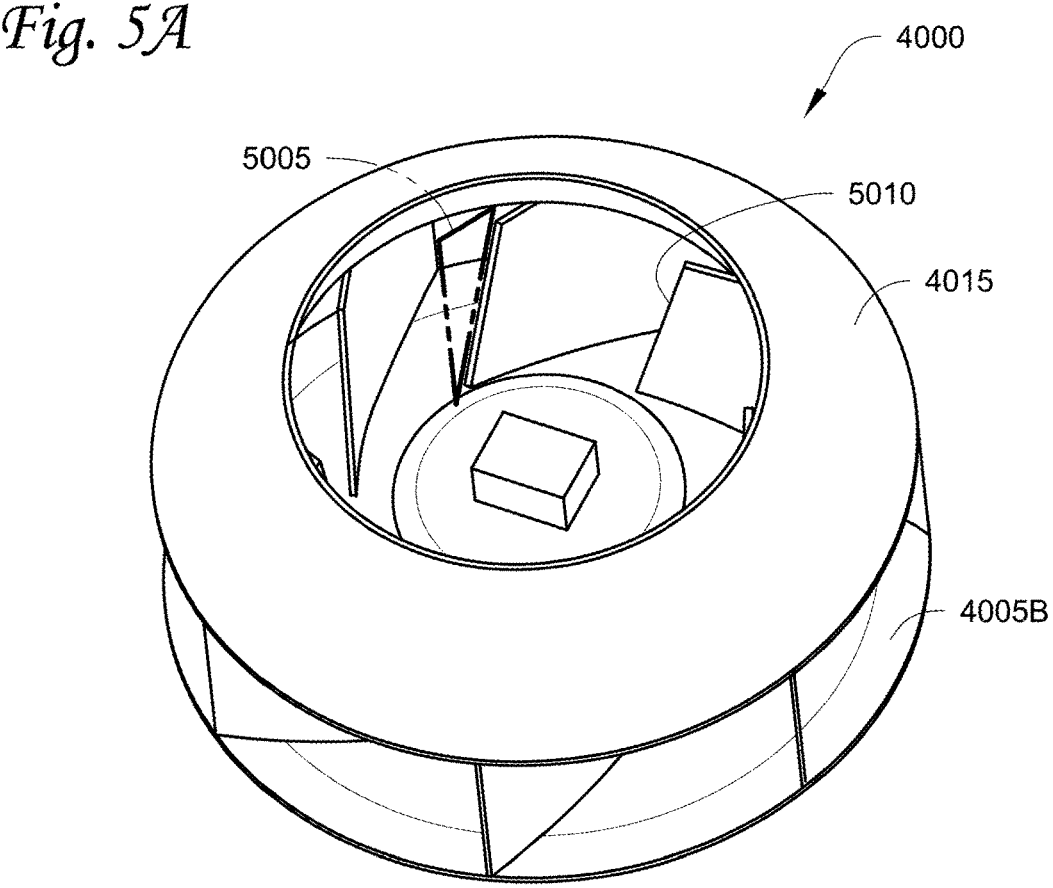
FIGS. 5A and 5B show components of a fan of a centrifugal blower, according to at least one embodiment described and recited herein.

FIG. 5A shows components of a singular one of fan blades 4010A-4010N of centrifugal blower 4000, according to at least one embodiment described and recited herein.

Each of blades 4010A-4010N may be trimmed near its leading edge to create a slant face, which provides an opening for manual or even mechanical adjustments. Accordingly, in at least one preferred embodiment, a chord length from top shroud 4015 to bottom portion 4005B of blower base 4005 may measure 171 mm.

In accordance with at least one example embodiment of centrifugal blower 4000 described and recited herein, centrifugal blower 4000 includes, at least, a trimmed area 5005 of blades 4010A-4010N, a slant leading edge 5010 of one of blades 4010A-4010N, top shroud 4015 and a bottom portion 4005B of blower base 4005.

Figure 5B:
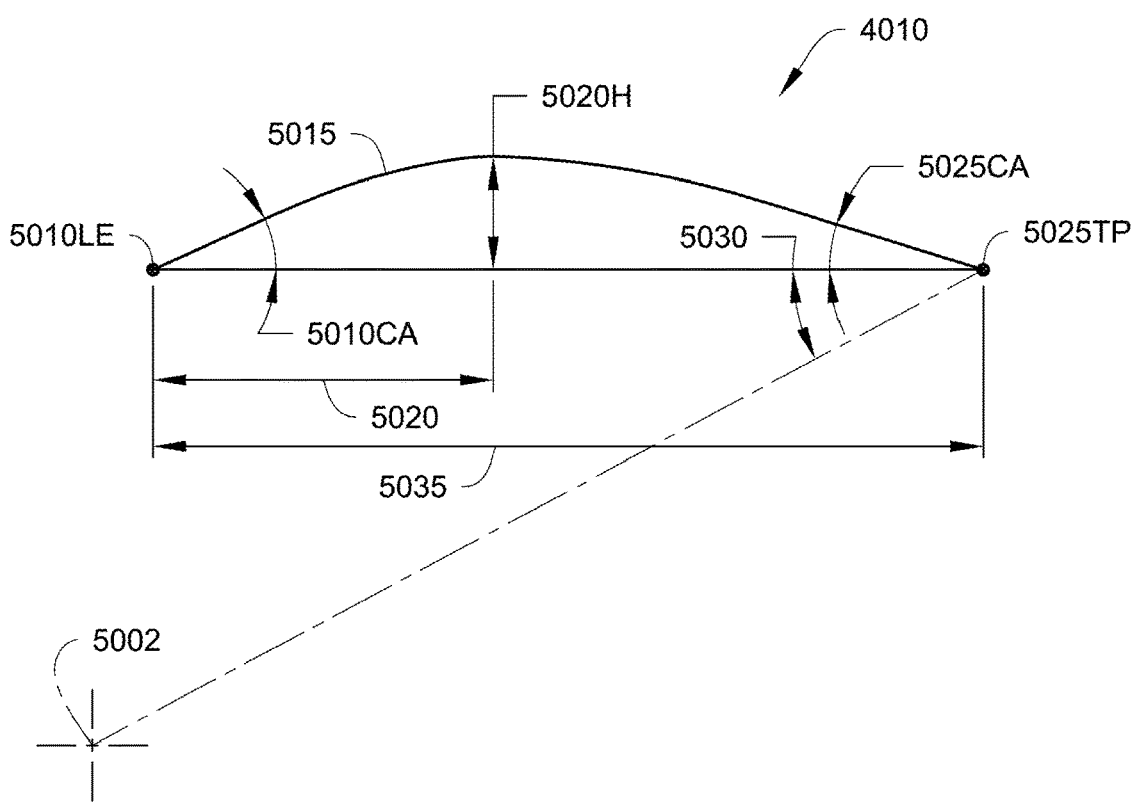

FIG. 5B shows a configuration of any one of identical blades 4010A-4010N as removably fastened to blower base 4005, relative to blower axis 5002.

As set forth above, variable configuration of fan blades 4010A-4010N enables centrifugal blower 400 to operate within a uniform or even standardized casing for evaporator 420. Accordingly, centrifugal blower 4000, as described and recited herein, may operate at operating speeds that are lower than those of typical or currently known implementations while generating an airflow that meets or even exceeds those of the typical or currently known implementations.

Variable components of each of blades 4010A-4010N, in accordance with the embodiments described and recited herein may include: leading edge camber angle 5010CA, leading edge 5010LE, blade curve 5015, maximum camber location 5020, maximum camber height 5020H, trailing edge camber angle 5025CA, trailing point 5025TP, stagger angle 5030, and chord line 5035.

As described and recited herein, blades may be designed by using a blade profile equation to generate a single blade curve that extrudes vertically, resulting in a surface of a respective blade. The blade surface may be extruded in a 3D manner, with thickness as described below. The blade may be trimmed near the leading edge, as described below, and filleted for smoothing of the trailing edge.

As described and recited herein, stagger angle may refer to an angle of attack for which the profile thereof provides an optimal lift-to-drag (L/D) ratio. The angle may be between the chord line and the line joining a center of the blower to the trailing edge. As the stagger angle increases, leading to an increased angle of attack, the L/D ratio increases.

A chord line may refer to a straight line joining a leading point to a training point, and a corresponding length thereof may be referred to as the chord length. As exploited by the embodiments described and recited herein, an increased chord length induces greater sweeping of air.

Camber may refer to a convexity of a blade profile. Camber is relevant to lift coefficient. That is, camber moves the maximum L/D ratio towards a lower angle of attack or towards lower stalling speed.

Maximum camber location may refer to the length of the chord from a leading point to a point of the maximum camber height. As maximum camber location increases, so does a sharpness of the blade. Performance for a lower maximum camber location is less efficient than that of blades having a greater maximum camber location.

Maximum camber height may refer to a maximum height of the convexity provided by a chord line. Camber is proportional to lift coefficient at a lower angle of attack, and the location thereof provides a curvature or sharpness to a blade profile, thus determining flow separation.

A leading edge camber angle may refer to an angle made by the chord line with a tangent drawn at a leading point. Thus, as the leading edge angle increases, the bluntness of the respective blade increases at the leading edge.

In accordance with at least one non-limiting example, a blade profile equation may be utilized to generate a single curve of a blade profile and extrude the curve vertically to generate a surface of the blade.

Thus, a leading edge to maximum camber height may be calculated by $$y=0.1869x^3-0.6152x^2+0.4972x-0.0491.$$

Further, a maximum camber height to trailing edge may be calculated by $$y=0.1882x^3-0.6172x^2+0.4983x-0.0493.$$

x is x/c and y is y/c, wherein c is chord length.

A trailing edge camber angle may refer to an angle made by the chord line with a tangent drawn at a trailing point. Thus, as the trailing edge angle increases, the bluntness of the respective blade increases at the trailing edge.

Thus, in accordance with at least one or more preferred embodiments of centrifugal blower 4000, a diameter thereof may be 430 mm; a length of chord line 5035 may be 192 mm, with an acceptable variance of ±10%; leading edge camber angle 5010CA may be 20°, with an acceptable variance of ±10%; trailing edge camber angle 5025CA may be 10°, with an acceptable variance of ±10%; maximum camber height 5020H may be of 6.9% of the length of chord line 5035, with an acceptable variance of ±10% at maximum camber location 5020 may be 42% of the length of chord line 5035, with an acceptable variance of ±10%; stagger angle 5030 may be 30°, with an acceptable variance of ±10%; and the number of blades N may range from 5 to 9, with a preferred embodiment of 7.

In accordance with at least one embodiment of a parametric blade design, with its curved blade profile, the following parameters may be included: Blower radius (R) may be 215 mm. Blower Diameter (D) may be 2 R. Chord length (C) may be 0.897 R, with an acceptable variance of ±10%. Leading edge camber angle may be 20°, with an acceptable variance of ±10%. Training edge camber angle may be 10°, with an acceptable variance of ±10%. Maximum camber height (% chord) may be 6.9%, with an acceptable variance of ±10%. Maximum camber location (% chord) may be 42%, with an acceptable variance of ±10%. Stagger angle may be 30%, with an acceptable variance of ±10%. Number of blades may be 7, with an acceptable variance of ±2. Suction diameter (Ds) may be 0.62 D. Blade height (b2) may be 0.25 D. Blade thickness (t) may be 0.02325 R.

Figure 6A:
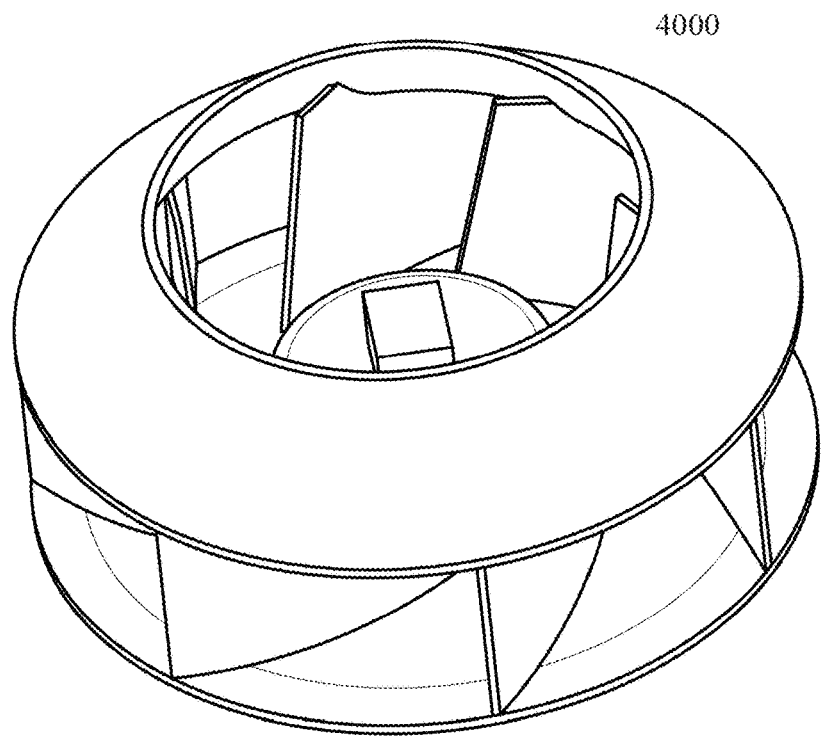
FIG. 6A shows a top view of an assembled centrifugal blower.
Figure 6B:
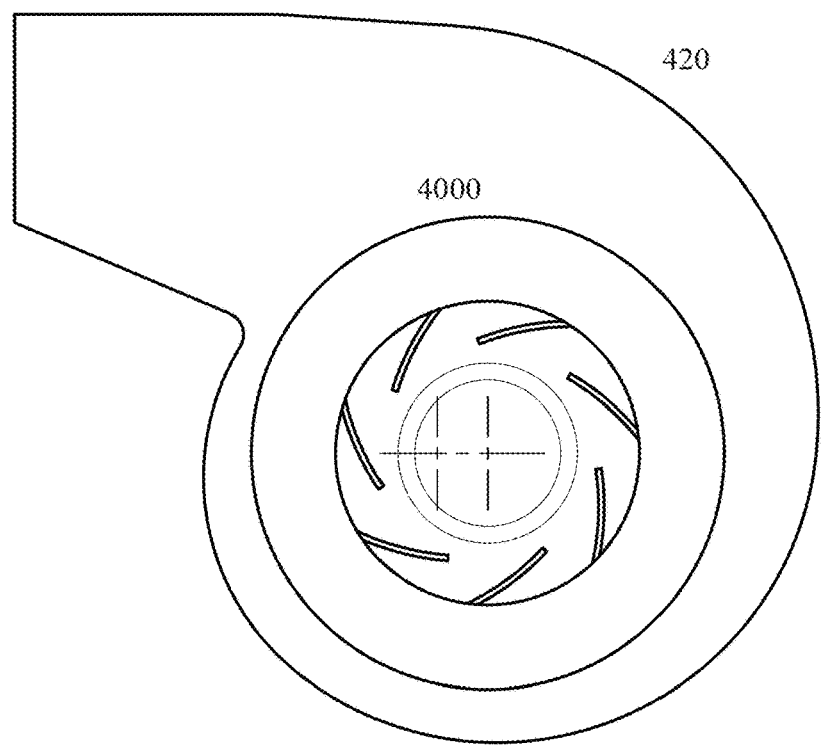
FIG. 6B shows a top view of the assembled centrifugal blower disposed within an evaporator, according to at least one embodiment described and recited herein.

In accordance with at least one embodiment of shroud 4015, the following parameters may be included:

FIG. 6A shows an assembled centrifugal blower, and FIG. 6B shows a top view of the assembled centrifugal blower disposed within evaporator 420, according to at least one embodiment described and recited herein. In accordance with at least one embodiment described and recited herein, an axial center of centrifugal blower 565 may be 32 mm towards a back portion of evaporator 420. Further, a clearance for each of blades 4010A-4010N may be 25 mm, with a +/− variance of 10%, from an inner wall of evaporator 420.

In accordance with the embodiments described and recited herein, within a given configuration, centrifugal blower 4000 generates required airflow against higher static conditions while operating at lower speeds. That is, centrifugal blower 4000 provides higher energy efficiency when benchmarked against designs that operate at comparatively higher speeds and require comparatively higher power consumption.

Aspects:

Aspect 1. A centrifugal blower, comprising:
a saucer-shaped blower base;
multiple blades fastened to the blower base; and
a casing to provide surrounding coverage to the multiple blades with a clearance between a tip of each of the multiple blades and an internal surface of a top of the casing,
wherein each of the multiple blades is trimmed near a leading edge thereof to create a slant face to provide clearance for servicing from an upper portion of the casing, with the top of the casing removed, to the blower base,
wherein the casing is disposed within the centrifugal blower, and
wherein the centrifugal blower is housed within an evaporator.

Aspect 2. The centrifugal blower of claim 1, wherein the clearance is 25 mm.

Aspect 3. The centrifugal blower of either Aspect 1 or 2, wherein a chord length of each of the blades is 171 mm and a stagger angle for each of the blades is 30°.

Aspect 4. The centrifugal blower of any of Aspects 1 to 3, wherein a leading edge camber angle for each of the blades is 20°.

Aspect 5. The centrifugal blower of any of Aspects 1 to 4, wherein the blower base of is concave in an inner portion thereof and the multiple blades are fastened to an outer portion of the blower base.

Aspect 6. The centrifugal blower of any of Aspects 1 to 5, wherein a diameter of the centrifugal blower is 430 mm.

Aspect 7. The centrifugal blower of any of Aspects 1 to 6, wherein an axial center of the centrifugal blower is 32 mm towards a back portion of the evaporator.

Aspect 8. The centrifugal blower of any of Aspects 1 to 7, wherein the blades are composed of a plastic and the casing is composed of a metal.

Aspect 9. The centrifugal blower of any of Aspects 1 to 8, wherein the blower base and the top shroud are fastened together.

Aspect 10. The centrifugal blower of any of Aspects 1 to 9, wherein the blower base and the top shroud are fastened together by fasteners, welding, or an adhesive.

Aspect 10. The centrifugal blower of any of Aspects 1 to 9, wherein the blower base and the casing are removably fastened together by pins projecting from a bottom portion of at least some of the blades.

Aspect 12. The centrifugal blower of any of Aspects 1 to 10, wherein the centrifugal blower comprises seven blades fastened to the blower base.

Aspect 13. A centrifugal blower, comprising:
a saucer-shaped blower base;
multiple blades fastened to the blower base; and a casing to provide surrounding coverage to the multiple blades with a 25 mm clearance between a tip of each of the multiple blades and an internal surface of a top of the casing,
    wherein a chord length of each of the blades is 171 mm, a stagger angle for each of the blades is 30°, and a leading edge camber angle for each of the blades is 20°,
    wherein the casing is disposed within the centrifugal blower, and
    wherein the centrifugal blower is housed within an evaporator.

Aspect 14. The centrifugal blower of Aspect 13, wherein each of the multiple blades is trimmed near a leading edge thereof to create a slant face to provide clearance for servicing from an upper portion of the casing, with the top of the casing removed, to the blower base.

Aspect 15. The centrifugal blower of either of Aspects 13 or 14, wherein the blower base of the blower is concave in an inner portion thereof and the multiple blades are fastened to an outer portion of the blower base.

Aspect 16. The centrifugal blower of any of Aspects 13 to 15, wherein a diameter of the centrifugal blower is 430 mm.

Aspect 17. The centrifugal blower of any of Aspects 13 to 16, wherein an axial center of the centrifugal blower is 32 mm towards a back portion of the evaporator.

Aspect 18. The centrifugal blower of any of Aspects 13 to 17, wherein the blades are composed of a plastic and the casing is composed of a metal.

Aspect 19. The centrifugal blower of any of Aspects 13 to 18, wherein the blower base and the top shroud are fastened together by a heat staking process.

Aspect 20. The centrifugal blower of any of Aspects 13 to 19, wherein the blower base and the casing are removably fastened together by pins projecting from a bottom portion of at least some of the blades.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

We claim:

1. A centrifugal blower, comprising:
    a saucer-shaped blower base;
    multiple blades fastened to the blower base; and
    a casing to provide surrounding coverage to the multiple blades with a clearance between a tip of each of the multiple blades and an internal surface of a top of the casing,
        wherein each of the multiple blades is trimmed near a leading edge thereof to create a slant face to provide clearance for servicing from an upper portion of the casing, with the top of the casing removed, to the blower base,
        wherein the casing is disposed within the centrifugal blower,
        wherein the centrifugal blower is housed within an evaporator,
        wherein the blower base and the casing are fastened together by pins projecting from a bottom portion of at least some of the blades,
        wherein a diameter of the centrifugal blower is 430 mm, and
        wherein an axial center of the centrifugal blower is 32 mm towards a back portion of the evaporator.

2. The centrifugal blower of claim 1, wherein the clearance is 25 mm.

3. The centrifugal blower of claim 1, wherein a chord length of each of the blades is 171 mm and a stagger angle for each of the blades is 30°.

4. The centrifugal blower of claim 1, wherein a leading edge camber angle for each of the blades is 20°.

5. The centrifugal blower of claim 1, wherein the blower base of is concave in an inner portion thereof and the multiple blades are fastened to an outer portion of the blower base.

6. The centrifugal blower of claim 1, wherein the blades are composed of a plastic and the casing is composed of a metal.

7. The centrifugal blower of claim 6, wherein the blower base and the top casing are fastened together.

8. The centrifugal blower of claim 6, wherein the blower base and the top casing are fastened together by fasteners, welding, or an adhesive.

9. The centrifugal blower of claim 1, wherein the centrifugal blower comprises seven blades fastened to the blower base.

10. The centrifugal blower of claim 1, wherein the bottom portion of the at least some blades has a curved top surface section from which the pins are projected and a straight top surface section extending from the curved top surface section in a direction toward a radial center of the blower base.

11. The centrifugal blower of claim 10, wherein the blower base is saucer-shaped to accommodate the curved top surface of the at least some blade and to direct gas within the blower towards the blades.

12. A centrifugal blower, comprising:
    a saucer-shaped blower base;
    multiple blades removably fastened to the blower base; and
    a casing to provide surrounding coverage to the multiple blades with a 25 mm clearance between a tip of each of the multiple blades and an internal surface of a top of the casing,
        wherein the casing is disposed within the centrifugal blower,
        wherein the centrifugal blower is housed within an evaporator,
        wherein the blower base and the casing are removably fastened together by pins projecting from a bottom portion of at least some of the blades,
        wherein a diameter of the centrifugal blower is 430 mm, and
        wherein an axial center of the centrifugal blower is 32 mm towards a back portion of the evaporator.

13. The centrifugal blower of claim 12, wherein each of the multiple blades is trimmed near a leading edge thereof to create a slant face to provide clearance for servicing from an upper portion of the casing, with the top of the casing removed, to the blower base.

14. The centrifugal blower of claim 12, wherein the blower base of the blower is concave in an inner portion thereof and the multiple blades are fastened to an outer portion of the blower base.

15. The centrifugal blower of claim 12, wherein the blades are composed of a plastic and the casing is composed of a metal.

16. The centrifugal blower of claim 15, wherein the blower base and the top casing are fastened together.

17. The centrifugal blower of claim 12, wherein the bottom portion of the at least some blades has a curved top surface section from which the pins are projected and a straight top surface section extending from the curved top surface section in a direction toward a radial center of the blower base.

18. The centrifugal blower of claim 17, wherein the blower base is saucer-shaped to accommodate the curved top surface of the at least some blade and to direct gas within the blower towards the blades.

* * * * *